Patented Aug. 24, 1954

2,687,155

UNITED STATES PATENT OFFICE 2,687,155

PROCESS FOR THE PRODUCTION OF SUBSTANTIALLY SKIN-FREE PEANUT KERNELS

Esler L. D'Aquin and Joseph Pominski, New Orleans, Laurie J. Molaison, Gretna, and Henry L. E. Vix, New Orleans, La., assignors to the United States of America as represented by the Secretary of Agriculture No Drawing. Application August 1, 1951, Serial No. 239,832

11 Claims. (Cl. 146—231)

(Granted under Title 35, U. S. Code (1952), sec. 266)

The invention herein described may be manufactured and used by or for the Government of the United States of America for governmental purposes throughout the world without the payment to us of any royalty thereon.

This invention relates to treating peanuts to isolate their kernels in the form of a raw material from which light colored meals can proteins can be obtained. It provides a commercially feasible process for removing substantially all of the skins from the kernels of peanuts graded to batches of substantially uniform size and development. It provides a commercially feasible process for removing the bulk of the skins from the kernels of any peanuts and at the same time removing soluble coloring matter from the remaining skins. It provides novel protein and meal raw materials consisting of peanut kernels having only about 5 to 15% attached skin and substantially no soluble color in the skin which is attached.

The serious problems created by the soluble color contained in the skins of peanuts is well known. The term "soluble color" is used throughout the specification and claims to refer to color bodies which are removed along with the proteins when they are isolated in the conventional manner, i. e., the color bodies that result in the formation of colored peanut protein and protein solutions.

Both physical and chemical methods for removing such color bodies have been proposed. It is of course known that the skins of roasted peanuts become loose and brittle and are easily removed. However, the temperatures required to so loosen the skins denature so much of the protein that such processes are not feasible for preparing a source of proteins. To avoid the effects of high temperatures and yet to remove the skins, processes and elaborate apparatuses have been developed for cutting the skins on each peanut and then removing the skins in blanchers. On the other hand, U. S. Patent 2,463,740 describes a process by which the soluble color is removed from the attached peanut skins by exposing them to dilute acid or alkali solutions.

We have discovered that by the application of a correlated series of operations and conditions, peanuts can be converted to kernels from which light colored meals and proteins can be obtained. When graded batches of peanuts of substantially uniform size and development are contacted with an aqueous medium until they take up at least about 20% of their weight, and then are substantially uniformly dried, at above about 100° F. but below temperatures at which the rate of protein denaturation becomes excessive, until their weight is not more than 10% above their dry weight; passing them through a split-nut blancher produces kernels containing substantially undenatured proteins and having as little as fractions of 1% attached skin. Applying the above operations and conditions to any of the commercial grades of peanuts markedly improves the amount of skin removal which can be accomplished by the rapid and economical action of a split-nut blancher. When such operations and conditions also involve an exposure to dilute acids or bases in accordance with the process described in U. S. 2,463,740; a novel and valuable source of light colored essentially skin-free peanut meal and protein is produced. For example, in this manner U. S. No. 1 grade peanut kernels having not more than about 5% attached skin, and U. S. No. 2 grade peanut kernels having not more than about 15% attached skin and containing substantially no soluble color in the skins which are attached can be produced by a relatively low cost process. Such kernels are valuable sources of peanut meals of remarkable light color for the cost of producing them, and low cost sources of comparatively colorless peanut proteins providing substantially no problems of skin contamination. In addition, a valuable new source of meal and protein can be produced by treating oil mill stock peanuts in the same manner. The treatment produces oil mill stock peanuts having less than about 50% attached skins and containing no soluble color in the skins which are attached.

The "per cent skin removal" referred to throughout the specification and claims is calculated in the following manner. A 100 gram sample of shelled peanuts is taken and any kernels containing skins are separated, weighed and counted. These kernels are divided into fractions with 100% skin coverage, ½ skin coverage, ⅓, ¼ and etc. For the calculation, kernels with skins partially removed are converted to equivalent kernels with 100% skins, i. e., four kernels with ¼ skin coverage are equivalent to one having 100% skin. Calculation:

Percent skin removal = 100 −
$$\frac{\text{no. of equivalent kernels with 100\% skin}}{\text{total no. of kernels with any skin}} \times$$
wt. of total kernels with any skin The "per cent attached skin" is calculated by subtracting the per cent skin removal from 100.

Where a substantially complete deskinning is desired, the peanuts are preferably graded with the elimination of damaged, shriveled, wrinkled, or immature peanuts and the selection of relatively uniform sized peanuts for each batch or continuous processing run. U. S. No. 1 or better grade peanuts are particularly preferred starting materials for the production of substantially skin-free kernels.

Water is the preferred aqueous medium in which to contact the peanuts. However, in order to obtain the various known effects such as skin blanching, a dilute aqueous solution of acids, bases or other reagents can be used. The peanuts can suitably be contacted with the aqueous medium by any convenient method such as dipping, spraying, and the like.

While the peanuts must be contacted with water until they take up an amount of water equal to at least about 20% of their original weight, we have observed that but little if any improvement in per cent skin removal results from allowing the peanuts to take up amounts of water equal to much more than 20% of their original weight. The peanuts are preferably contacted with the aqueous medium until they increase in weight by about from 20 to 30%.

We have observed but little if any variation in the percent skin removal due solely to variations in the temperature of the aqueous medium in which the peanuts were soaked. We have found soaking at about normal room temperature (86° F.) to be a particularly convenient method of causing the peanuts to take up about 20% or more water.

We have observed but little if any variation in percent skin removal due solely to variation in the time the soaked peanuts were allowed to stand prior to the commencement of the drying operation. The same is true of the rate at which the peanuts are dried, except, as it is well known, the longer the peanuts are exposed to an elevated temperature the more advanced the denaturation of the protein becomes. We have found circulating hot air to be an effective drying medium. When it is applied under atmospheric pressures so that the temperatures of the kernels remain at about 120 to 180° F. (i. e., drying at kernel-temperatures of from about 120 to 180° F.), it is productive of sufficiently uniform drying without appreciable protein denaturations.

To provide a high percent skin removal the drying should reduce the weight of the peanut kernels to not more than about 9% above their dry weight. We have found that where graded batches of peanuts are contacted with water until they take up at least 20%, drying them in the preferred manner to from 3 to 5% moisture, results in the removal of 98% or more of the skins by the blancher.

Where the soaking is done in an aqueous medium in which the soluble color of the skins is removed in accordance with the process of U. S. 2,465,740, the drying can advantageously be terminated at a higher moisture content. While the blancher removes less skin from peanuts so treated, the skins remaining are free of soluble color. Such peanut kernels particularly when the skin content is not more than approximately 15%, provide the particularly valuable sources of low cost peanut meals of a relatively light color and low cost substantially colorless peanut proteins or protein solutions referred to above. Particularly when the peanuts are soaked in an aqueous medium containing a dilute acid or base and the drying step is terminated at about 7 to 9% moisture (the optimum moisture content for flaking prior to solvent extraction), a particularly valuable source of substantially colorless proteins or protein solutions is produced.

We have found that while the water-dipping inherently removes a large part of the soluble color in the skins so that kernels having about 5% attached skin, which skin has been water-dipped, contain less skin pigments than do those containing the same amount of skin which has not been water-dipped, a skin removal by water-dipping of at least about 98% is necessary to approach the optimum lightness in color (that obtainable by a complete deskinning of the peanuts).

The following experimental results are presented to illustrate in more detail certain features involved in the practice of this invention. However, as it is apparent that numerous variations can suitably be made in practicing the invention, the scope of the invention is defined by the claims and is not to be construed as being limited to the particular materials and conditions used in the described experiments.

*Results summarized in Table I*

A series of experiments were conducted, using U. S. No. 1 shelled peanuts to determine the optimum conditions for the deskinning process by water-treatment, drying and blanching. A standard split nut blancher was used in the conventional manner in the blanching of the peanuts. Conditions studied were the effects of moisture remaining after dipping and after drying, dipping temperatures, drying temperatures, different types of heating without dipping, and overnight moisture equilibration prior to blanching.

Experiments 1 through 5 show that if approximately 98% of the skins are to be removed, a moisture absorption of at least about 20% is necessary. However, an increase of only 7% in moisture absorption in this deskinning process raises the skin removal from 44.6 to 91.7%. Experiments 4 and 6 show that moisture equilibra- TABLE I.—PRELIMINARY DATA ON SKIN REMOVAL FROM U. S. NO. 1 SPANISH PEANUT KERNELS

| Experiment No. | 1 | 2 | 3 | 4 | 5 | 6 | 7 | 8 | 9 | 10 | 11 | 12 | 13 |
|---|---|---|---|---|---|---|---|---|---|---|---|---|---|
| Description | Control No Treatment | Dipping at Room Temperature | | | | | | | | Heat Only | | Dipping at 140° F., Drying at 180° F.[1] | |
| | | Drying at 120° F.[1] | | | | | | Drying at 180° F.[1] | | Vacuum Oven[3] | Circulating Air Oven[4] | | |
| Wt. of peanut kernels, lb. | 5 | 5 | 5 | 5 | 5 | 5 | 5 | 5 | 5 | 2.5 | 5 | 5 | 5 |
| Moisture, percent | 7.37 | 7.37 | 7.37 | 7.37 | 7.37 | 7.37 | 7.37 | 7.37 | 7.37 | 7.37 | 7.37 | 7.37 | 7.37 |
| Soaking time, minutes | | (2) | 25/60. | 2 | 10 | 2 | 2 | 2 | 2 | | | 1 | 1 |
| Soaking temperature, ° F. | | 87 | 87 | 87 | 74 | 86 | 86 | 87 | 87 | | | 140 | 140 |
| Moisture absorbed, percent orig. wt. | | 7.0 | 14.0 | 21.2 | 27.0 | 22.0 | 21.4 | 20.8 | 20.8 | | | 21.2 | 21.4 |
| Moisture in wet peanuts, percent. | | 13.46 | 18.77 | 23.6 | 27.1 | 24.10 | 23.75 | 23.35 | 23.35 | | | 23.6 | 23.75 |
| Drying time, hours | | 20.75 | 20.75 | 19.0 | 25.33 | 20.75 | 6.22 | 5.55 | 2.13 | 4.0 | 4.0 | 6.0 | 3.67 |
| Drying temperature, ° F. | | 120 | 120 | 120 | 120 | 120 | 180 | 180 | 180 | 200 | 200 | 180 | 180 |
| Moisture after drying, percent. | | 3.94 | 5.14 | 3.99 | 4.88 | 4.63 | 7.26 | 4.40 | 7.80 | 2.14 | 1.72 | 4.56 | 6.65 |
| Blanched immediately | x | x | x | x | x | | x | x | x | x | x | x | x |
| Blanched next day | | | | | | x | | | | | | | |
| After Blanching: | | | | | | | | | | | | | |
| Deskinned meats, percent. | 96.9 | 93.8 | 94.10 | 94.1 | 93.8 | 93.0 | 92.50 | 93.2 | 94.3 | 93.9 | 93.5 | 93.2 | 93.0 |
| Skins removed, percent. | 1.80 | 3.5 | 2.8 | 3.1 | 2.5 | 4.4 | 4.9 | 3.4 | 3.6 | 3.5 | 3.6 | 3.3 | 3.0 |
| Hearts removed, percent. | 1.3 | 2.9 | 3.1 | 2.8 | 3.7 | 2.6 | 2.6 | 3.4 | 2.1 | 2.6 | 2.9 | 2.5 | 4.0 |
| Skin removal, percent | 44.6 | 91.7 | 95.4 | 97.6 | 98.3 | 97.1 | 96.0 | 98.3 | 96.9 | 75.0 | 94.9 | 98.9 | 98.1 |

[1] Drying after dipping was done in air circulating oven.
[2] Dipped in water and pulled out instantaneously.
[3] Kernels several layers thick.
[4] Kernels one layer thick.

tion overnight at approximately 4% $H_2O$ has negligible effect on skin removal. Experiments 4, 7, 8, and 9 show that at lower final moisture levels more skin removal is obtained for drying temperatures of either 120° or 180° F. Experiments 10 and 11 show that a high percentage of skin removal is obtained by the use of heat alone in an air circulating dryer as compared to a low skin removal by vacuum oven drying at the same temperature. Experiments 12 and 13 show that a highly satisfactory skin removal is obtained by dipping peanuts at 140° F. and drying at 180° F. Here again, lower final moisture levels yield better skin removal.

Heating of peanuts at 200° F. (Exp. No. 11) in an air circulating oven without prior treatment yields a skin removal of 94.9% as compared to 95.4 (Exp. No. 3) and 97.6% (Exp. No. 4) for water-dipping at moisture absorptions of 14 and 21.2% respectively. However, this does not show the total color removal effect since water dipping removes a large part of the color in the skins remaining on kernels.

Results summarized in Table II

As a result of the small scale experiments performed, a 40-pound batch of U. S. No. 1 shelled peanuts identical with those used in the preliminary tests was processed at the optimum conditions; see Table II, column 1. Prior to blanching these shelled peanuts, a 5 pound portion of kernels was removed and further dried at 180° F. for 2 hours. A high percentage of skin removal of 98.9% was obtained for the remaining 35 pound batch of kernels, and additional heating at 180° F. showed practically no increase in skin removal. Lipids and protein losses were low, being 0.04 and 0.05%, respectively, by weight of kernels as compared to losses of 0.13 and 0.53% respectively obtained by using a 0.5% sodium hydroxide solution treatment as described in U. S. 2,463,740. Thus lipids and protein losses are smaller as would be expected, for the water dipping, drying and blanching method than for the alkali treatment of U. S. No. 1 shelled peanuts. The remaining columns in Table II show results obtained in water dipping and processing four other lots of U. S. No. 1 Spanish shelled peanuts. These lots were cracked, flaked and solvent extracted with commercial hexane in a batch extractor to give defatted meals having a high protein solubility.

TABLE II.—SKIN REMOVAL OF U. S. NO. 1 SPANISH PEANUT KERNELS BY WATER DIPPING, DRYING AND BLANCHING PROCESS AT OPTIMUM CONDITIONS

| Batch No. | 1 | 2 | 3 | 4 | 5 | 6 |
|---|---|---|---|---|---|---|
| Wt. of peanut kernels, lbs. | 40 | 120 | 98 | 105 | 111 | 112 |
| Moisture, percent | 7.4 | 7.6 | 5.2 | 5.2 | 5.7 | 5.7 |
| Soaking time, minutes | 10 | 35 | 15 | 10 | 2.5 | 2.5 |
| Soaking temperature, ° F. | 83 | 66 | 81 | 82 | 88 | 88 |
| Moisture absorbed, percent original wt. | 27.5 | 21.5 | 25 | 23.8 | 22.6 | 21 |
| Drying time, hours | 23.3 | 15.5 | 21.5 | 21.5 | 18.5 | 18.5 |
| Drying temperature, ° F. | 120 | 120 | 120 | 120 | 125 | 125 |
| Moisture after drying, percent | 4.3 | 5.5 | 4.3 | 4.1 | 4.4 | 4.4 |
| Deskinned meals, after blanching, percent | 93.9 | 94.1 | 92.9 | 92.9 | 93.2 | 93.2 |
| Skins, removed by blanching, percent | 3.5 | 3.2 | 3.5 | 3.5 | 3.6 | 3.6 |
| Hearts, removed by blanching, percent | 2.6 | 2.7 | 3.6 | 3.6 | 3.2 | 3.2 |
| Skin removal, percent | 98.9 | 99+ | 99+ | 99+ | 98.7 | 98.7 |
| Losses: | | | | | | |
| Lipids, percent kernel wt. | 0.04 | | | | 0.004 | 0.004 |
| Lipids, percent original lipids | 0.08 | | | | 0.008 | 0.008 |
| Protein[a], percent kernel wt. | 0.05 | | | | 0.02 | 0.02 |
| Protein, percent original protein[b] | 0.19 | | | | 0.05 | 0.05 |
| Protein Solubility of Solvent Extracted Meal[c] | | 96.2 | 94.1 | 94.1 | 89.7 | 89.7 |

[a] Protein = 6.25 × nitrogen.
[b] Percent protein or nitrogen = $\frac{\text{Nitrogen lost}}{\text{Nitrogen in original kernels}} \times 100$.
[c] Protein solubility determined at pH 7.5 using NaOH and at room temperature.

Results summarized in Table III

Approximately 1000 g. of U. S. No. 1 shelled peanuts from the 40 lb. batch which had undergone the water-treatment, drying and blanching treatment were flaked, defatted with commercial hexane in a large soxhlet and the meal produced was air dried. Protein was prepared by peptizing the meal at pH 7.5 with sodium hydroxide using a 20:1 water to meal ratio at room temperatures, removing the solids by screening and centrifuging, precipitating the protein at pH 4.5 with sulfur dioxide and recovering same by centrifugation. The protein was then dried at 120° F. in an air circulating oven. Visual examination showed it to have a cream color.

Table III gives I. C. I. tristimulus data determined on an alkaline solution (by the methods of Fontaine, T. D., Detwiler, S. B., Jr., Irving, G. W., Jr., Ind. Eng. Chem. 37, 1232–1236 (1945), and Hardy, A. C., "Handbook of Colorimetry," Cambridge, Technology Press (1936)) of this protein and proteins similarly prepared from a common lot of peanut kernels, a portion of which was treated with 0.5% sodium hydroxide for color removal, and another which had 100% skins removed after water-dipping and drying. This data shows that the color of the protein solutions made from kernels with skins treated with 0.5% sodium hydroxide solution and kernels treated by water-treatment, drying, and blanching are essentially the same and differ only slightly from the protein solution prepared from shelled peanuts with 100% skins removed.

TABLE III.—I. C. I. TRISTIMULUS DATA ON ALKALINE SOLUTIONS OF PEANUT PROTEINS

| Protein | Treatment of U. S. No. 1 Kernels Prior to Solvent Extraction | $x$ | $y$ | Luminous Transmittance percent | Dominant Wave length, $m\mu$ | Purity, percent |
|---|---|---|---|---|---|---|
| 1 | Lye Dipping (0.5% NaOH) | 0.3215 | 0.3335 | 91.6 | 572.0 | 7.8 |
| 2 | Water Dipping, 98.9% skins removed. | 0.3215 | 0.3341 | 91.8 | 571.5 | 7.9 |
| 3 | Water Dipping, 100% skin removal. | 0.3206 | 0.3336 | 92.9 | 570.8 | 7.5 |

There are several conditions in which a combination of alkali treatment and blanching of peanut kernels may be preferable. Ninety percent deskinned, hexane extracted peanut meals may be prepared from alkali treated U. S. No. 2 shelled peanuts, which are products from lower grade shelled peanuts that are not only free of the undesirable soluble skin pigments but also have the greater portion of the skins removed. In the solvent extraction of the peanut oil from the peanuts the optimum moisture content for flaking is about 7 to 9% (Gastrock, E. A., and D'Aquin, E. L., Oil Mill Gaz. 53 (4), 13–21 (1948)). As this is higher than the 4 to 5% remaining in the peanut kernels treated for maximum skin removal by water-treatment, drying, etc., in accordance with the present process, it is necessary the so treated kernels be remoistened before extraction. Where it is necessary to obtain protein products free of the objectionable skin pigment color or meal products wherein a small percentage of skins is permissible, the above described aqueous alkali treatment, drying, etc., of the U. S. No. 1 peanut kernels prior to blanching allows them to be dried directly to the optimum moisture for solvent extraction.

Having thus described our invention, we claim:

1. A process for the production of substantially skin-free peanut kernels, which process comprises: grading the peanuts into batches which on the basis of uniformity of development and size are equivalent to U. S. No. 1 grade; contacting the graded peanut with liquid water until they take up at least about 20% by weight of water, drying the wet peanuts, at from 100° F. to a temperature at which the protein denaturation becomes excessive, until they contain not more than about 9% moisture; and passing the dried peanuts through a split-nut blancher.

2. The process of claim 1 in which the peanuts are contacted with water at normal room temperature, the drying is conducted in circulating hot air at kernel temperatures of from 120 to 180° F., and is continued until the dried peanuts contain from about 3 to 5% moisture.

3. A process for the production of peanut kernels having minor amounts of skins attached and containing substantially no soluble color in the skin which is attached, which process comprises: contacting peanuts with a liquid aqueous solution of the group consisting of dilute acids and bases until the peanuts take up at least about 20% by weight of solution; drying the wet peanuts, at from 100° F. to a temperature at which the protein denaturation becomes excessive, until the weight of the peanuts is not more than about 9% above the dry weight of the peanuts; and removing the skins in a split-nut blancher.

4. The process of claim 3 in which the peanuts are contacted with dilute sodium hydroxide at normal room temperature until they increase in weight by at least about 20%, and are dried in circulating hot air at kernel temperatures of from 120 to 180° F. until their weight is from about 7 to 9% above their dry weight.

5. In a process of de-skinning peanuts by the action of a split-nut blancher, the improvement which comprises: grading the peanuts into batches which on the basis of uniformity of development and size are equivalent to U. S. No. 1 grade; contacting the graded peanuts with liquid water until they take up at least about 20% by weight of water; drying the wet peanuts, at from 100° F. to a temperature at which the protein denaturation becomes excessive, until they contain not more than about 9% moisture; and passing the dried peanuts through a split-nut blancher.

6. In a process of manufacturing peanut proteins, the improvement which comprises: contacting peanuts with a liquid aqueous medium until they increase in weight by at least 20%; drying the peanuts at from 100° F. to temperatures at which the protein denaturation becomes excessive until their weight is not more than about 9% greater than their dry weight; and subjecting the dried peanuts to the action of a split-nut blancher.

7. A process for the production of substantially skin-free peanut kernels, which process comprises: contacting peanuts which, on the basis of uniformity of development and size, are equivalent to the U. S. No. 1 grade, with liquid water until they contain from about 20 to 30% by weight of water; drying the wet peanuts, at from 100° F. to a temperature below that at which the protein denaturation becomes excessive, until they contain from about 3 to 5% moisture; and passing the dried peanuts through a split-nut blancher.

8. The process of claim 7 in which the peanuts are contacted with water at normal room temperature, the drying is conducted in circulating hot air at kernel temperatures of from 120 to 180° F., and is continued until the dried peanuts contain from about 3 to 5% moisture.

9. A process for the production of peanut kernels having minor amounts of skins attached and containing substantially no soluble color in the skin which is attached, which process comprises: contacting peanuts which, on the basis of uniformity of development and size, are at least equivalent to U. S. No. 2 grade, with a liquid aqueous solution of the group consisting of dilute acids and bases, until the peanuts contain from about 20 to 30% by weight of solution; drying the wet peanuts, at from 100° F. to a temperature below that at which the protein denaturation becomes excessive, until the weight of the peanuts is not more than from about 3 to 9% above the dry weight of the peanuts; and removing the skins in a split-nut blancher.

10. The process of claim 9 in which the peanuts are contacted with dilute sodium hydroxide at normal room temperature until they increase in weight by from about 20 to 30% and are dried in circulating hot air at kernel temperatures of from 120 to 180° F. until their weight is from about 7 to 9% above their dry weight.

11. In a process of de-skinning peanuts by the action of a split-nut blancher, the improvement which comprises: contacting peanuts which, on the basis of uniformity of development and size, are at least equivalent to U. S. No. 2 grade, with a liquid aqueous medium, until they increase in weight by from about 20 to 30%; drying the wet peanuts, at from 100° F. to a temperature below that at which the protein denaturation becomes excessive, until they contain from about 3 to 9% moisture; and passing the dried peanuts through a split-nut blancher.

References Cited in the file of this patent

UNITED STATES PATENTS

| Number | Name | Date |
|---|---|---|
| 574,647 | Weatherly | Jan. 5, 1897 |
| 617,266 | Watson | Jan. 3, 1899 |
| 791,473 | Kellogg et al. | June 6, 1905 |
| 1,190,555 | Kelly | July 11, 1916 |
| 1,448,431 | Gastruccio | Mar. 13, 1923 |
| 1,515,386 | Grohens | Nov. 11, 1924 |
| 1,979,384 | Harbaugh | Nov. 6, 1934 |
| 2,366,711 | Earle | Jan. 9, 1945 |
| 2,463,740 | Burnett | Mar. 8, 1949 |